Aug. 16, 1966   R. C. FRISBIE   3,266,607
TORQUE CONTROL MECHANISM
Filed April 27, 1964   3 Sheets-Sheet 1

INVENTOR.
RICHARD C. FRISBIE
BY
ATTORNEY

Aug. 16, 1966  R. C. FRISBIE  3,266,607
TORQUE CONTROL MECHANISM
Filed April 27, 1964  3 Sheets-Sheet 2

INVENTOR.
RICHARD C. FRISBIE
BY
ATTORNEY

Aug. 16, 1966  R. C. FRISBIE  3,266,607
TORQUE CONTROL MECHANISM
Filed April 27, 1964  3 Sheets-Sheet 3

INVENTOR.
RICHARD C. FRISBIE
BY
ATTORNEY

United States Patent Office 3,266,607
Patented August 16, 1966

3,266,607
TORQUE CONTROL MECHANISM
Richard C. Frisbie, Sayre, Pa., assignor to Ingersoll-Rand Company, New York, N.Y., a corporation of New Jersey
Filed Apr. 27, 1964, Ser. No. 362,765
4 Claims. (Cl. 192—56)

This invention relates to torque control mechanisms and more particularly to a torque control mechanism which includes a clutch and means for maintaining the clutch disengaged when it disengages upon a predetermined torque load.

In conventional torque control mechanisms having a lockout clutch, manual pressure is required to reset or re-engage the clutch after the mechanism has locked in a disengaged position.

It is, therefore, an object of the present invention to provide a torque control mechanism having a lockout clutch which is automatically reset or re-engaged after disengagement upon a predetermined torque load.

It is another object of this invention to provide a torque control mechanism having a lockout clutch interposed between a driving member and a driven member, which clutch is automatically reset or re-engaged in response to the rotation of the driving member.

Accordingly, the present invention contemplates a novel torque control mechanism comprising a clutch interposed between a driving member and a driven member, which clutch is constructed and arranged to transmit the rotation from the driving member to the driven member and, upon a predetermined torque load on the driven member, to disengage and cease the tarnsmission of the rotation from the driving member to the driven member. A lockout means coacting with the clutch is provided to maintain the clutch in a disengaged position. A centrifugal actuator is connected to the driving means and cooperates with the lockout means to maintain the clutch in a disengaged position and allow re-engagement of the clutch when the rotation of the driving member substantially ceases.

The above and other objectives and advantages of the present invention will appear more fully hereinafter from a consideration of the detailed description which follows when taken together with the accompanying drawings wherein one embodiment of the invention is illustrated and in which.

Figure 1:
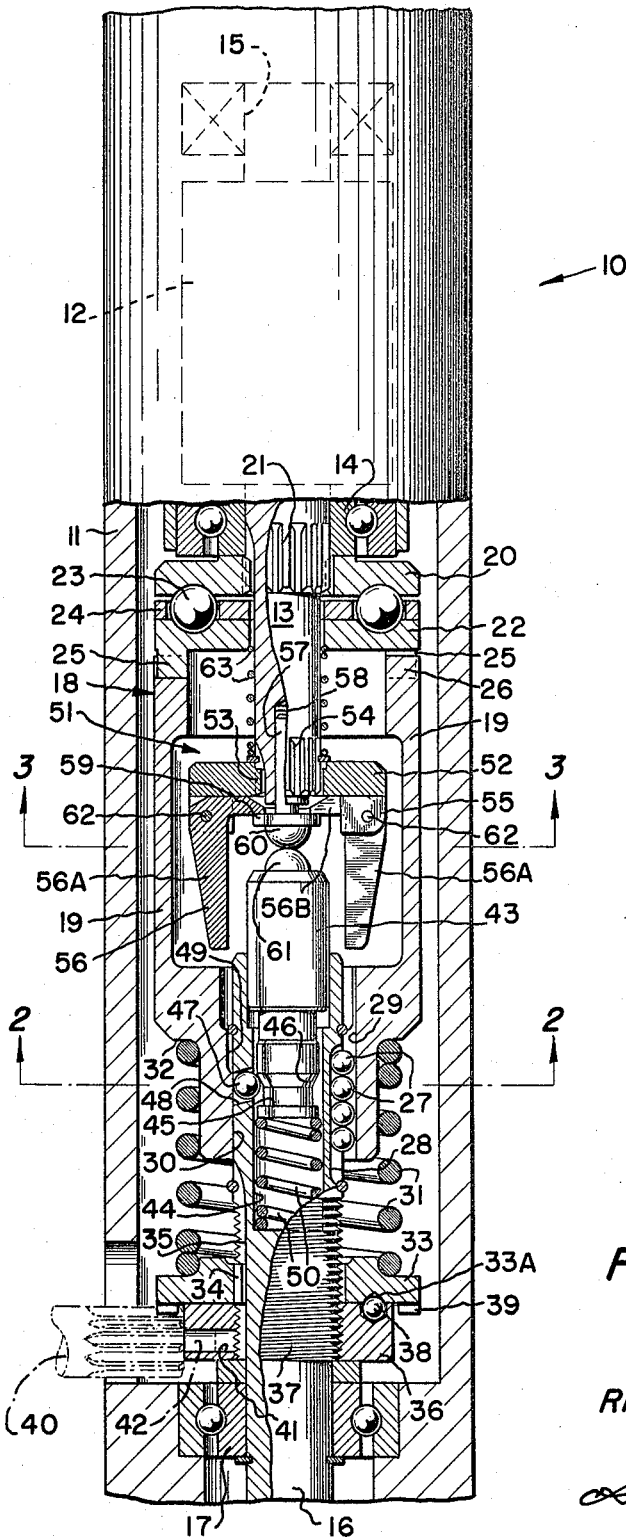
FIG. 1 is a fragmentary view of a power tool having a torque control mechanism according to this invention.
Figure 2:
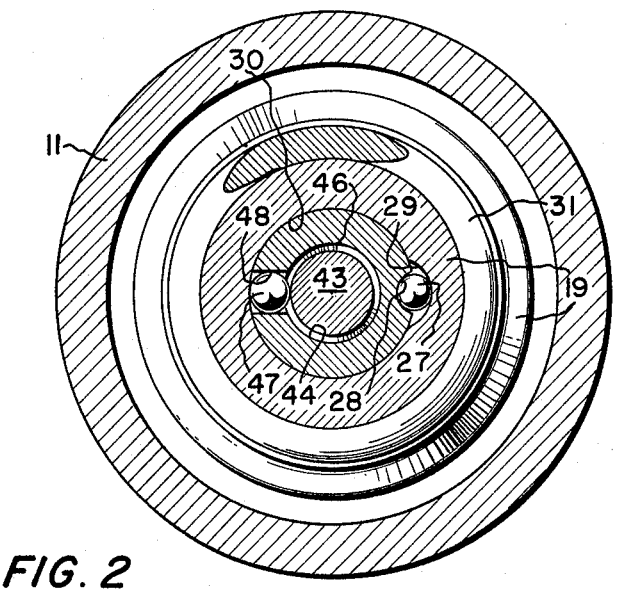
FIG. 2 is an enlarged cross-sectional view taken along line 2—2 of FIG. 1.
Figure 3:
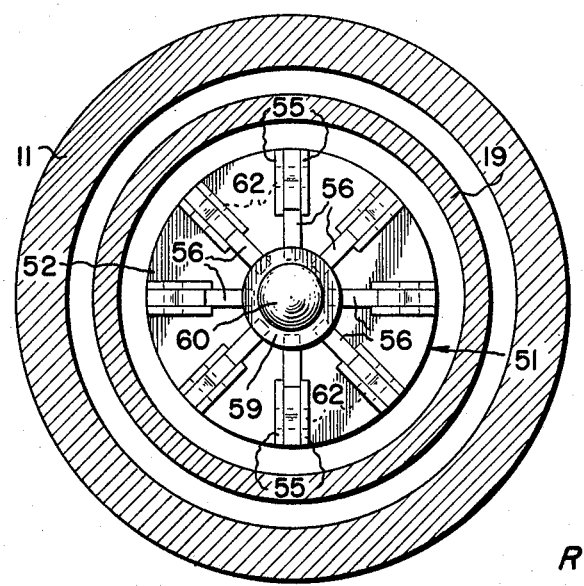
FIG. 3 is an enlarged view in cross section taken along line 3—3 of FIG. 1.

Now referring to the drawings, 10 designates in general to a power tool, such as a screwdriver, angle wrench, nut runner, or the like, having a torque control mechanism according to this invention. While the invention is shown and will be described as applied to a power tool, it is not limited thereto. It will be obvious hereinafter that the invention has appliction to any device wherein a clutch is provided to control the transmission of the rotation from a driving member to a driven member and it is desirable to lock out or maintain the clutch in a disengaged position upon a predetermined torque load on the driven member.

Power tool 10 comprises a housing or casing 11 which has a motor 12 therein. The motor may be of any well-known type of fluid or electric motor having a driving shaft or rotor 13. The rotor 13 is supported coaxially in housing 11 by bearings 14 and 15. A driven member or spindle 16, axially spaced from and in alignment with rotor 13, is supported for rotation in housing 11 by bearings 17 (only one of which is shown in FIG.1). Spindle 16 is connected at one end (not shown) to a work engaging member (not shown), such as a screwdriver bit, socket, or the like, to rotate such member.

To transmit the rotation from rotor 13 to spindle 16, a clutch assembly 18 is disposed in housing 11. The clutch assembly comprises a camming subassembly and a cup-shaped clutch element 19. The camming subassembly consists of a cam disc 20 which is spline-connected at 21 to rotor 13 and a cam jaw disc 22 disposed adjacent to cam disc 20. A plurality of balls 23 are disposed between cam disc 20 and cam jaw disc 22, the balls partly projecting into juxtaposed recesses in the complementary surfaces of the cam disc and the cam jaw disc. The balls are retained in circumferentially spaced relationship to each other by a retaining plate 24. Cam jaw disc 22 is mounted on rotor 13 for rotative and axial movement relative to the rotor. Cam jaw disc 22 is provided with a plurality of jaws 25 which mesh with a plurality of jaws 26 on the end of the clutch element 19 so that the rotation of the camming subassembly is transmitted to clutch element 19.

Clutch element 19 is keyed to spindle 16 by a plurality of balls 27 which partly extend into a longitudinal slot 28 in the surface of spindle 16 and partly into a juxtaposed longitudinal slot 29 in the surface of axial bore 30. The ball and slot keying arrangement permits conjoined rotation of clutch element 19 and spindle 16 and relative axial movement of clutch element 19 with respect to spindle 16. Clutch element 19 is biased in an upward direction, as viewed in FIG. 1, by a spring 31 which bears at one end against a shoulder 32 formed by the enlarged diameter, cup-shaped portion of clutch element 19. The opposite end of spring 31 bears against a spring seat 33 which has a key 34 engaging a longitudinal slot 35 in the outer surface of spindle 16.

To provide for adjusting the tension of spring 31, an adjusting nut 36 is turned upon the threads 37 formed on spindle 16. Adjusting nut 36 is disposed adjacent spring seat 33 and is supported in close spaced relationship to spring seat 33 by a plurality of circumferentially spaced balls 38 (only one of which is shown in the drawings). Balls 38 are staked in the holes in adjusting nut 36 and project into registered detents 33A in spring seat 33 to lock, under the urging of spring 31, adjusting nut 36 and spring seat 33 rotatively together and prevent adjusting nut 36 from rotating on spindle threads 37 in relationship to spring seat 33. Spring seat 33 is provided with a pluarlity of gear teeth 39 which are adapted to be engaged by a Jacobs wrench 40 (shown in broken lines in FIG. 1) extending through a slot in casing 11. A plurality of circumferentially spaced holes 41 (only one of which is shown) are formed in the outer surface of adjusting nut 36 to receive the guide pin of the Jacobs wrench.

In adjusting the tension of spring 31 to provide for the disengagement of clutch assembly 18 at different torque loads, the rotation of Jacobs wrench 40 turns spring seat 33 through gear teeth 39. The rotation of spring seat 33 causes spindle 16 to rotate by reason of the key 34 and slot 35 connection between the spring seat and the spindle. The rotation of the spindle causes the other components, including motor 12, to rotate. The nut 36 remains stationary and, due to the rotation of the spindle, move axially relative to spindle 16 by reason of the meshing relationship of nut 36 with threads 37 of spindle 16. The axial movement of adjusting nut 36 effects the axial movement of spring seat 33, balls 38 snapping into and riding out of detents 33A as spring seat 33 relative to adjusting nut 36.

The clutch assembly 18 includes a lockout means with functions to hold the clutch assembly in a disengaged position when disengagement is effected upon a predetermined torque load on the spindle.

The lockout means comprises a plunger lock 43 which is slidably mounted in an axial recess 44 formed in the end of spindle 16. Plunger lock 43 has an annular groove 45, one wall of which is inclined to provide a camming surface 46. A locking ball 47 is mounted in an opening or pocket 48 in the wall of spindle 16 adjacent groove 45. Camming surface 46 functions to permit radial movement of ball 47 in pocket 48. A lockout pocket or recess 49 is formed in axial bore 30 of clutch element 19 and is dimensioned to receive a portion of ball 47 therein. A spring 50 is disposed in recess 44 to seat against the bottom of the recess and at the opposite end bear against plunger lock 43 to bias the latter in a direction toward rotor 13. Plunger lock 43, lockout recess 49, and ball 47 cooperate to hold clutch assembly 18 in a disengaged position when clutch element 19 is moved axially in a direction toward spring seat 33 against the tension of spring 31 so as to bring lockout recess 49 in alignment with ball 47 (see FIG. 4).

To provide for slidably moving plunger lock 43 within recess 44 against the tension of spring 50, a flyweight means 51 responsive to the rotation of rotor 13 is secured to the distal end of rotor 13.

Flyweight means 51, hereinafter referred to as a centrifugal actuator unit, comprises a body or frame 52 which has a splined central bore 53 to engage splines 54 formed on the distal end of rotor 13. The splined interconnection between frame 52 and rotor 13 permits axial movement of frame 52 with respect to rotor 13 simultaneous with the conjoined rotation of the frame and the rotor. Frame 52 is provided with a plurality of pairs of spaced ears 55. A flyweight 56 of L-shaped configuration is pivotally mounted at 62 between each pair of ears 55 so that a relatively large or massive leg 56A extends parallel with the axes of the spindle and the rotor and a relatively small leg 56B extends adjacent frame 52 toward the axis of rotor 13. A plunger or pin 57 is slidably disposed within an axial bore 58. Pin 57 has a head 59 against which leg 56B bears. Head 59 includes a hemispherical portion 60 which engages a similar hemispherical portion 61 of plunger lock 43. A spring 63 is disposed around rotor 13 to bias centrifugal actuator unit 51 toward plunger lock 43.

The centrifugal actuator unit 51 is held on the distal end of rotor 13 by plunger lock 43 which is constantly biased in engagement with the centrifugal actuator unit by spring 50. The rotation of frame 52 is not transmitted to plunger lock 43 by reason of the point contact between hemispherical portions 60 and 61 at the axis of rotation of the centrifugal actuator unit.

In the operation of the apparatus described herein and as shown in FIG. 1, the rotation of rotor 13 is transmitted to cam disc 20 and through balls 23 to cam jaw disc 22. The rotation of cam jaw disc 22 is transmitted to clutch element 19 through interengaging jaws 25 and 26 of cam jaw disc 22 and clutch element 19, respectively. Clutch element 19 transmits the rotation to spindle 16 through balls 27. The spindle, in turn, rotates a work-engaging member (not shown). The rotation of rotor 13 also effects the rotation of centrifugal actuator unit 51, the rotation of which exerts a centrifugal force on flyweights 56, tending to throw legs 56A outwardly away from the axis of rotation and thereby pivot flyweights 56 about pivots 62. Flyweights 56 are prevented from pivoting because plunger lock 43 prevents pin 57 from moving axially and hence prevents legs 56B of the flyweights from moving away from frame 52. The above-described relationship of the components of the apparatus remains the same until a predetermined torque load on spindle 16 is reached.

When a predetermined torque load on the spindle is reached, which torque load is transmitted to cam jaw disc 22 through clutch element 19, cam disc 20 overrides cam jaw disc 22 so that balls 23 ride out of the recesses in cam disc 20. When balls 23 ride out of the recesses in cam disc 20, cam jaw disc 22 and clutch element 19 are forced axially relative to spindle 16 toward spring seat 33 against the force of spring 31. The axial movement of clutch element 19 brings lockout recess 49 into alignment with ball 47. Since plunger lock 43 is urged to slide in recess 44 against the tension of spring 50 by the centrifugal force exerted against the plunger lock by flyweights 56 through pin 57, and ball 47 is now free to move radially, ball 47 is cammed by camming surface 46 into pocket 49 by the axial movement of plunger lock 43. With plunger lock 43 held in the position shown in FIG. 4 by the action of flyweights 56, clutch element 19 is held in a disengaged position so that no rotation is transmitted from cam disc 20 and jaw disc 22 to the clutch element 19.

Figure 4:
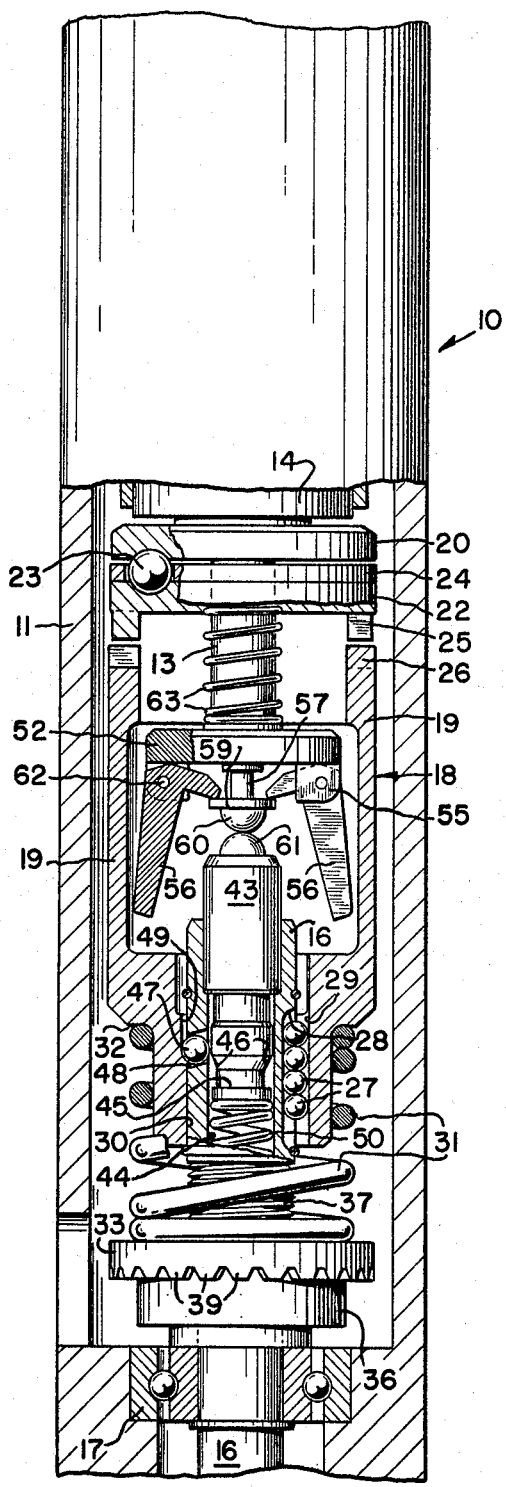
FIG. 4 is a view, similar to FIG. 1, showing another operative position of the torque control mechanism.

When rotor 13 stops rotating, as by stopping the operation of motor 12, flyweights 56 move from the position shown in FIG. 4 to that shown in FIG. 1, thereby permitting spring 50 to move plunger lock 43 toward rotor 13. When groove 45 is brought into alignment with ball 47, ball 47 is free to move into groove 45. With ball 47 free to move into groove 45, ball 47 is cammed out of pocket 49 by the movement of clutch element 19 under the force of spring 31. The clutch assembly 18 is now reset or re-engaged and is ready for another cycle of operation.

In brief, the foregoing structure includes a "first clutch element" 19 slidably keyed or splined to the driven shaft or spindle 16, a "second clutch element" 20 fixed to the driving shaft 13 and a "cam means" interposed between the "first" and "second clutch elements" 19 and 20 and including the cam jaw disc 22, the cam balls 23, the ball retaining plate 24, the clutch jaws 25 and the cam ball pockets in both the "second clutch element" 20 and the cam jaw disc 22. The "cam means" normally interconnects the "first" and "second clutch elements" 19 and 20 and in response to a predetermined torque load, disengages the "first" and "second clutch elements" 19 and 20. The "first clutch element" 19 is held in a disengaged position by a "lock means" including the lock-out plunger 43 forcing the locking ball 47 into the lock-out pocket 49 formed in the bore of the "first clutch element" 19. The lock-out plunger 43 is forced toward its locking position by the "centrifugal actuator unit" 51 mounted on the driving shaft 13.

It is believed now readily apparent that a novel torque control mechanism having a lockout clutch has been provided, which mechanism automatically resets or re-engages the clutch after each cycle of operation.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

Having described my invention, I claim:
1. A torque control mechanism comprising
 (a) a driven shaft and a driving shaft axially spaced from each other,
 (b) said driving shaft being connected to a source of rotary power,
 (c) a clutch having a first clutch element and a second clutch element,
 (d) said first clutch element being mounted on said driven shaft for conjoined rotation with the latter and slidable movement relative to the driven shaft,
 (e) said second clutch element being connected to said driving shaft for conjoined rotation with the latter,
 (f) cam means interposed between said first and said second clutch elements to provide conjoined rotation of said first and said second clutch elements and, upon a predetermined torque load, allow relative rotation between the elements and axially move said first clutch element relative to the second clutch element and said driven shaft to thereby interrupt the transmission of rotation from the driving shaft to the driven shaft, (g) a lock means carried by said driven shaft and coacting with said first clutch element to hold the latter in the position interrupting the transmission of rotation, and (h) a centrifugal actuator unit separate from said lock means carried by said driving shaft and engaging said lock means, (i) said centrifugal actuator unit being responsive to the rotation of the driving shaft to cause said lock means to lock said first clutch element in a position interrupting the transmission of rotation from said driving shaft to said driven shaft and allow said lock means to release said first clutch element when said driving shaft substantially ceases to rotate.

2. The apparatus of claim 1 wherein said centrifugal actuator unit has pivotally mounted flyweghts so that the unit is responsive to the rotation of the driving shaft.

3. The apparatus of claim 1 wherein said lock means includes a ball carried by the driven shaft, a lockout pocket formed in the first clutch element, and a plunger lock slidably mounted in said driven shaft for controlling the movement of said ball into and out of said lockout pocket, said plunger lock being engaged by the centrifugal actuator unit.

4. A torque control mechanism comprising
(a) a driven shaft and a driving shaft axially spaced from each other,
(b) said driving shaft being connected to a source of rotary power,
(c) a clutch having a first clutch element and a second clutch element,
(d) said first clutch element being mounted on said driven shaft for conjoined rotation and slidable movement relative to the driven shaft,
(e) said second clutch element being connected to said driving shaft for conjoined rotation with the latter,
(f) cam means disposed between and coacting with said first and said second clutch elements to provide conjoined rotation of said first and said second clutch elements and, upon a predetermined torque load, allow relative rotation between the first and the second clutch elements and axially move said first clutch element relative to the second clutch element and said driven shaft to thereby interrupt the transfer of rotation from the driving shaft to the driven shaft,
(g) a lock means carried by said driven shaft and coacting with said first clutch element to hold the latter in the position interrupting the transmission of rotation,
(h) a frame connected to the driving shaft for conjoined rotation with the latter,
(i) a plurality of flyweights pivotally connected to said frame, and
(j) a contact member in engagement with said flyweights and mounted in said driving shaft for axial, slidable movement with said lock means,
(k) said flyweights being constructed and arranged to effect slidable movement of said contact member so that the latter prevents the movement of said lock means from releasing said first clutch element and, upon the cessation of rotation of the driving shaft, permits the lock means to release said first clutch element.

References Cited by the Examiner

UNITED STATES PATENTS

| 1,710,694 | 4/1929 | Ferenci | 192—56 X |
| 1,745,738 | 2/1930 | Carter | 192—56 |
| 1,793,735 | 2/1931 | Mater | 192—105 |
| 2,493,232 | 1/1950 | Dodge | 192—104 |
| 2,587,712 | 3/1952 | Dodge | 192—103 |
| 2,859,846 | 11/1958 | Shappell | 192—56 |

FOREIGN PATENTS

| 819,045 | 10/1951 | Germany. |
| 900,849 | 7/1962 | Great Britain. |

DAVID J. WILLIAMOWSKY, *Primary Examiner.*
DON A. WAITE, *Examiner.*
B. W. WYCHE III, *Assistant Examiner.*